United States Patent
Izumi et al.

(10) Patent No.: US 11,365,665 B2
(45) Date of Patent: Jun. 21, 2022

(54) POROUS MATERIAL, HONEYCOMB STRUCTURE, AND METHOD OF PRODUCING POROUS MATERIAL

(71) Applicant: NGK Insulators, Ltd., Nagoya (JP)

(72) Inventors: Yunie Izumi, Nagoya (JP); Takahiro Tomita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 600 days.

(21) Appl. No.: 15/782,064

(22) Filed: Oct. 12, 2017

(65) Prior Publication Data

US 2018/0112576 A1    Apr. 26, 2018

(30) Foreign Application Priority Data

Oct. 24, 2016   (JP) .............................. JP2016-208153
Jun. 9, 2017    (JP) .............................. JP2017-113987
Sep. 7, 2017    (JP) .............................. JP2017-172071

(51) Int. Cl.
*B01J 29/70*  (2006.01)
*F01N 3/28*  (2006.01)
(Continued)

(52) U.S. Cl.
CPC ....... *F01N 3/2828* (2013.01); *B01D 53/9418* (2013.01); *B01J 35/04* (2013.01); *B01J 35/1033* (2013.01); *B01J 37/0246* (2013.01); *C04B 35/565* (2013.01); *C04B 35/62807* (2013.01); *C04B 35/62897* (2013.01); *C04B 35/6316* (2013.01); *C04B 38/0006* (2013.01);
(Continued)

(58) Field of Classification Search
CPC ....... B01J 35/04; F01N 3/2828; C04B 35/565
See application file for complete search history.

(56) References Cited

U.S. PATENT DOCUMENTS 3,885,977 A * 5/1975 Lachman ............... B01D 53/86
501/80
2003/0148063 A1    8/2003 Morimoto et al.
(Continued)

FOREIGN PATENT DOCUMENTS

| | | |
|---|---|---|
| CN | 1277173 A | 12/2000 |
| CN | 1316400 A | 10/2001 |

(Continued)

OTHER PUBLICATIONS

Ding, S.; Zhu, S.; Zeng, Y.; Jiang, D.; "Fabrication of Mullite-Bonded Porous Silicon Carbide Ceramics by In Situ Reaction Bonding", Journal of European Ceramic Society, 2007, p. 2095-2102.*

(Continued)

*Primary Examiner* — Mark Ruthkosky
*Assistant Examiner* — Julia L Rummel
(74) *Attorney, Agent, or Firm* — Burr & Brown, PLLC

(57) ABSTRACT

A porous material includes an aggregate, and a binding material that binds the aggregate together in a state where pores are formed. The porous material contains 0.1 to 10.0 mass % of an MgO component, 0.5 to 25.0 mass % of an $Al_2O_3$ component, and 5.0 to 45.0 mass % of an $SiO_2$ component with respect to the mass of the whole porous material, and further contains 0.01 to 5.5 mass % of an Sr component in terms of SrO.

11 Claims, 7 Drawing Sheets

(51) Int. Cl.
*B01J 35/04* (2006.01)
*C04B 35/628* (2006.01)
*C04B 38/00* (2006.01)
*C04B 35/565* (2006.01)
*C04B 35/63* (2006.01)
*B01D 53/94* (2006.01)
*B01J 35/10* (2006.01)
*B01J 37/02* (2006.01)
*C04B 111/00* (2006.01)

(52) U.S. Cl.
CPC .. *C04B 38/0074* (2013.01); *B01D 2255/2027* (2013.01); *B01D 2255/2092* (2013.01); *B01D 2255/20707* (2013.01); *B01D 2255/30* (2013.01); *B01D 2255/9155* (2013.01); *B01D 2255/9205* (2013.01); *C04B 2111/0081* (2013.01); *C04B 2111/00793* (2013.01); *C04B 2235/3201* (2013.01); *C04B 2235/3206* (2013.01); *C04B 2235/3213* (2013.01); *C04B 2235/3215* (2013.01); *C04B 2235/3229* (2013.01); *C04B 2235/3481* (2013.01); *C04B 2235/3826* (2013.01); *C04B 2235/656* (2013.01); *C04B 2235/6584* (2013.01); *C04B 2235/72* (2013.01); *C04B 2235/96* (2013.01); *F01N 2330/06* (2013.01)

(56) References Cited

U.S. PATENT DOCUMENTS

| | | | |
|---|---|---|---|
| 2004/0266617 A1* | 12/2004 | Fujii | B01J 23/58 502/340 |
| 2005/0143255 A1 | 6/2005 | Morimoto et al. | |
| 2005/0158534 A1* | 7/2005 | Tabuchi | C04B 38/061 428/304.4 |
| 2007/0026190 A1 | 2/2007 | Baba | |
| 2009/0297764 A1* | 12/2009 | Beall | C04B 35/195 428/116 |
| 2010/0218473 A1 | 9/2010 | Kikuchi et al. | |
| 2014/0357476 A1 | 12/2014 | Bischof et al. | |
| 2014/0370232 A1 | 12/2014 | Izumi et al. | |
| 2015/0093540 A1* | 4/2015 | Ichikawa | C04B 35/573 428/117 |
| 2015/0259254 A1* | 9/2015 | Ichikawa | C04B 35/565 428/116 |
| 2015/0266779 A1 | 9/2015 | Miyairi et al. | |
| 2016/0273426 A1 | 9/2016 | Kuki | |

FOREIGN PATENT DOCUMENTS

| | | |
|---|---|---|
| CN | 1767884 A | 5/2006 |
| DE | 10 2015 003 218 B4 | 9/2016 |
| DE | 10 2016 002 708 A1 | 9/2016 |
| JP | 4111439 B2 | 7/2008 |
| JP | 4227347 B2 | 2/2009 |
| JP | 5478259 B2 | 4/2014 |
| JP | 2014-194172 A | 10/2014 |
| JP | 5922629 B2 | 5/2016 |
| JP | 2016-523800 A1 | 8/2016 |
| JP | 6043340 B2 | 12/2016 |

OTHER PUBLICATIONS

American Elements, "Silicon Carbide", 2016, p. 1-6; Accessed at https://web.archive.org/web/20160523024409/https://www.americanelements.com/silicon-carbide-409-21-2.*
American Elements, "Cordierite", 2016, p. 1-10; Accessed at https://web.archive.org/web/20160822131650/https://www.americanelements.com/cordierite-1302-88-1.*
U.S. Appl. No. 15/782,049, filed Oct. 12, 2017, Tsuboi, Mika.
U.S. Appl. No. 15/782,093, filed Oct. 12, 2017, Izumi, Yunie.
U.S. Appl. No. 15/785,838, filed Oct. 17, 2017, Izumi, Yunie.
Chinese Office Action, Chinese Application No. 201710982466.X, dated Mar. 3, 2021 (7 pages).

* cited by examiner

POROUS MATERIAL, HONEYCOMB STRUCTURE, AND METHOD OF PRODUCING POROUS MATERIAL

TECHNICAL FIELD

The present invention relates to a porous material, a honeycomb structure, and a method of producing a porous material. More specifically, the present invention relates to a high-strength porous material, a high-strength honeycomb structure, and a method of producing the porous material.

BACKGROUND ART

Porous materials with a plurality of pores, in which an aggregate such as silicon carbide particles (SiC particles) is bound together with a binding material as an oxide phase such as cordierite, have excellent properties such as high thermal shock resistance. These porous materials are used to form honeycomb structures that include a plurality of cells partitioned off and formed by partition walls, and these honeycomb structures are used as catalyst carriers or diesel particulate filters (DPFs) in various applications such as processing for purifying exhaust gases (see Japanese Patent Nos. 4111439 and 4227347, for example).

The Japanese Patent No. 5478259 discloses a silicon carbide porous body that contains silicon carbide particles as an aggregate and an oxide as a binding material and in which the amount of the added oxide to the surface area of the silicon carbide particles is greater than or equal to 0.5 g/m$^2$ and less than 3.0 g/m$^2$, and the oxide contains Si elements and Sr. Japanese Patent Application Laid-Open (Translation of PCT Application) No. 2016-523800 describes that a formed ceramic substance used as a support for catalysts desirably retains a low sodium content in order to maintain high catalytic activity.

In recent years, some applications have demanded large-sized catalyst carriers or DPFs using the above-described porous materials. Thus, large-sized honeycomb structures are produced, which have large honeycomb diameters and long axial lengths (honeycomb lengths). On the other hand, honeycomb structures other than large-sized honeycomb structures are also produced, such as those having complicated cell structures in order to improve functionality and performance, and those having thin partition walls that partition off and form cells in order to suppress pressure loss.

These honeycomb structures are subjected to heavy thermal loads or dynamic loads during use. Hence, the honeycomb structures formed of the porous materials are required to have adequate strength (mechanical strength) for dynamic loads, in addition to high thermal shock resistance.

SUMMARY OF INVENTION

The present invention is intended for a porous material, and it is an object of the present invention to increase the mechanical strength of the porous material.

A porous material according to the present invention includes an aggregate, and a binding material that binds the aggregate together in a state where pores are formed. The porous material contains 0.1 to 10.0 mass % of an MgO component, 0.5 to 25.0 mass % of an Al$_2$O$_3$ component, and 5.0 to 45.0 mass % of an SiO$_2$ component with respect to a mass of the porous material as a whole, and further contains 0.01 to 5.5 mass % of an Sr component in terms of SrO.

Another porous material according to the present invention includes an aggregate, and a binding material that binds the aggregate together in a state where pores are formed. The binding material contains 5.0 to 15.0 mass % of an MgO component, 30.0 to 60.0 mass % of an Al$_2$O$_3$ component, and 30.0 to 55.0 mass % of an SiO$_2$ component with respect to a mass of the binding material as a whole, and further contains 0.3 to 15.0 mass % of an Sr component in terms of SrO.

According to the present invention, it is possible to increase the mechanical strength of the porous material.

In a preferred embodiment of the present invention, the binding material contains 50 mass % or more of cordierite with respect to a mass of the binding material as a whole.

In another preferred embodiment of the present invention, the ratio of the mass of the binding material to the mass of the porous material as a whole is in a range of 8 to 40 mass %.

In another preferred embodiment of the present invention, an alkali metal component is contained in the porous material, and a ratio of a mass of the alkali metal component in terms of an oxide is less than 0.1 mass % of the porous material as a whole.

For example, the porous material contains Na or K as the alkali metal component.

In another preferred embodiment of the present invention, the aggregate contains SiC particles as particle bodies. In this case, it is preferable that the aggregate further contains oxide films that are formed on surfaces of the particle bodies, and more preferably, the oxide films contain cristobalite. The oxide films have a thickness of, for example, 0.3 to 5.0 μm.

Preferably, at least part of the Sr component contained in the binding material exists as SrAl$_2$Si$_2$O$_8$. The ratio of the mass of the SrAl$_2$Si$_2$O$_8$ to the mass of the porous material as a whole is in a range of 0.1 to 10.0 mass %.

It is preferable that a representative value for an angle at which an edge of the binding material in a cross-section of the porous material rises with respect to a direction tangent to the edge at a position at which curvature is locally a maximum is greater than 0 degrees and less than or equal to 25 degrees.

The present invention is also intended for a honeycomb structure. The honeycomb structure according to the present invention is a tubular member made of the porous material described above and having an interior partitioned into a plurality of cells by partition walls.

The present invention is also intended for a method of producing a porous material. A method of producing a porous material according to the present invention includes a) obtaining a compact by molding a mixture of an aggregate raw material, a raw material of binding material, and a pore forming material, and b) obtaining a porous material by firing the compact, the porous material being a fired compact. The porous material contains 0.1 to 10.0 mass % of an MgO component, 0.5 to 25.0 mass % of an Al$_2$O$_3$ component, and 5.0 to 45.0 mass % of an SiO$_2$ component with respect to a mass of the porous material as a whole, and further contains 0.01 to 5.5 mass % of an Sr component in terms of SrO.

Another method of producing a porous material according to the present invention includes a) obtaining a compact by molding a mixture of an aggregate raw material, a raw material of binding material, and a pore forming material, and b) obtaining a porous material by firing the compact, the porous material being a fired compact. A binding material of the porous material contains 5.0 to 15.0 mass % of an MgO component, 30.0 to 60.0 mass % of an Al$_2$O$_3$ component, and 30.0 to 55.0 mass % of an SiO$_2$ component with respect to a mass of the binding material as a whole, and further contains 0.3 to 15.0 mass % of an Sr component in terms of SrO.

Preferably, the method of producing a porous material further includes c) subjecting the porous material to oxidation treatment, and the aggregate raw material contains SiC particles. The temperature of the oxidation treatment in the operation c) is in a range of, for example, 1200 to 1350° C.

These and other objects, features, aspects and advantages of the present invention will become more apparent from the following detailed description of the present invention when taken in conjunction with the accompanying drawings.

DESCRIPTION OF EMBODIMENTS

Hereinafter, embodiments of a porous material, a honeycomb structure, and a method of producing a porous material will be described with reference to the drawings. The porous material, the honeycomb structure, and the method of producing a porous material according to the present invention are not intended to be limited to the embodiments described below, and various design changes, modifications, improvements are possible without departing from the gist of the present invention.

(1) Porous Material

Figure 1:
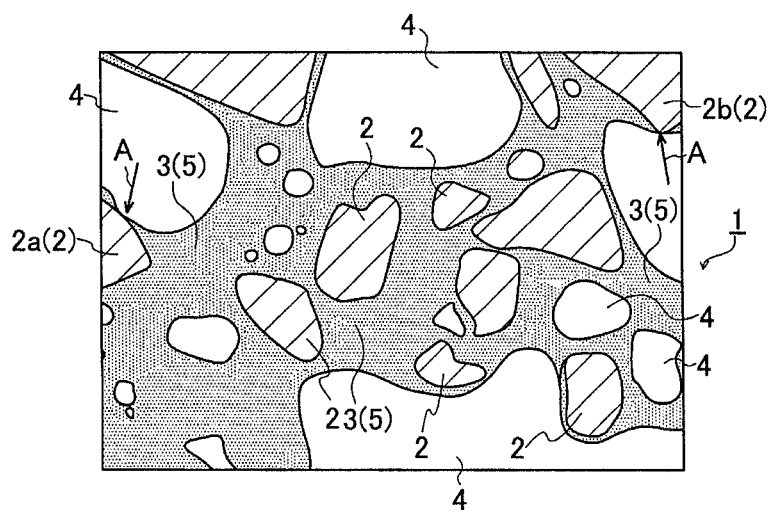
FIG. 1 illustrates a structure of a porous material.
Figure 2:
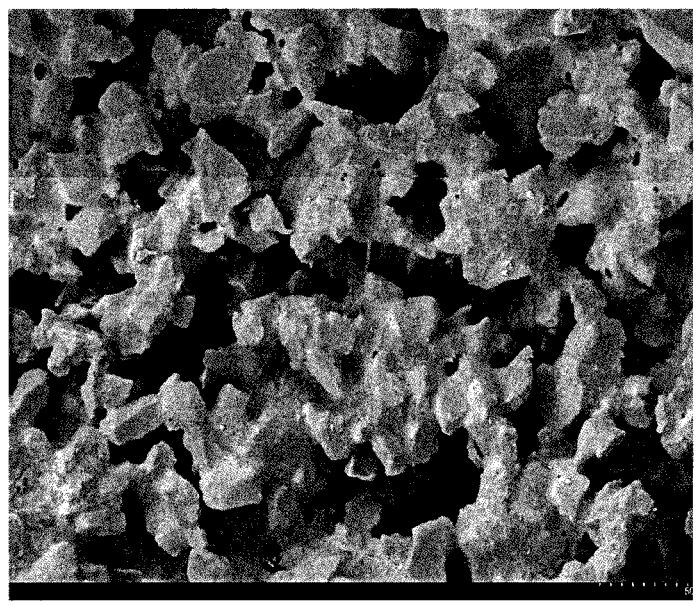
FIG. 2 illustrates a photograph showing an example of the porous material.
Figure 3:
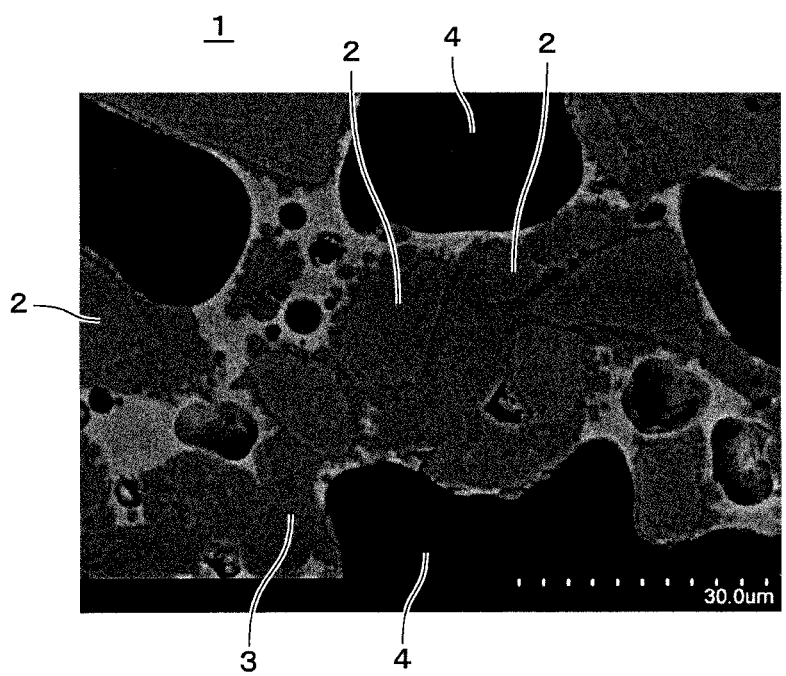
FIG. 3 illustrates a photograph showing another example of the porous material.

FIG. 1 schematically illustrates a structure of a porous material 1. FIGS. 2 and 3 show examples of the porous material 1 that is actually produced, both illustrating photographs taken with a scanning electron microscope. FIG. 2 illustrates a surface of the porous material 1, and FIG. 3 illustrates a mirror-polished cross-section of the porous material 1.

The porous material 1 according to the present embodiment is a ceramics material composed primarily of an aggregate 2 and a binding material 3 that binds the aggregate 2 together in a state where pores 4 are formed. The ratio of the mass of the aggregate 2 to the total mass of the aggregate 2 and the binding material 3, i.e., the ratio of the mass of the aggregate 2 to the mass of the whole porous material 1, is greater than or equal to 50 mass %. In other words, the ratio of the mass of the binding material 3 is less than or equal to 50 mass % of the whole porous material 1. Preferably, the ratio of the mass of the binding material 3 is greater than or equal to 8 mass % of the whole porous material 1. This composition ensures a certain level of mechanical strength (typically, bending strength; hereinafter also simply referred to as "strength") of the porous material 1. In order to further increase the strength of the porous material 1, the ratio of the binding material 3 in the porous material 1 is preferably greater than or equal to 10 mass %, and more preferably greater than or equal to 12 mass %. If the ratio of the binding material 3 in the porous material 1 exceeds 40 mass %, the porous material 1 will have more difficulty in achieving high porosity, and therefore the ratio is preferably less than or equal to 40 mass %. In order for the porous material 1 to easily achieve high porosity, the ratio of the binding material 3 in the porous material 1 is preferably less than or equal to 35 mass %, and more preferably less than or equal to 30 mass %.

The binding material 3 contains 5.0 to 15.0 mass % (i.e., greater than or equal to 5.0 mass % and less than or equal to 15.0 mass %; the same applies hereinafter) of a magnesium (Mg) component in terms of magnesium oxide (MgO), 30.0 to 60.0 mass % of an aluminum (Al) component in terms of aluminum oxide ($Al_2O_3$), and 30.0 to 55.0 mass % of a silicon (Si) component in terms of silicon dioxide ($SiO_2$) with respect to the mass of the whole binding material 3. In other words, the binding material 3 contains 5.0 to 15.0 mass % of an MgO component, 30.0 to 60.0 mass % of an $Al_2O_3$ component, and 30.0 to 55.0 mass % of an $SiO_2$ component with respect to the mass of the whole binding material 3. As will be described later, the binding material 3 preferably contains cordierite that is formed of an MgO component, an $Al_2O_3$ component, and an $SiO_2$ component. The binding material 3 also contains 0.3 to 15.0 mass % of a strontium (Sr) component 5 in terms of strontium oxide (SrO) with respect to the mass of the whole binding material 3. In the porous material 1, substances other than the aggregate 2 are assumed to be, in principle, included in the binding material 3. In a typical example of the porous material 1, surfaces at three-phase interfaces of the aggregate 2, the binding material 3, and the pores 4 are formed in a "smoothly bound" state as in a cross-sectional microstructure schematically illustrated in FIG. 1, Here, the "smoothly bound" surfaces at the three-phase interfaces refer to a state in which the binding material 3 that binds particles of the aggregate 2 together extends either smoothly or in a gentle curve (or along a curved surface) from the vicinity of a three-phase interface (e.g., three phase interfaces A in FIG. 1; see the arrows) of one particle of the aggregate 2, the binding material 3, and a pore 4 in a direction toward another particle of the aggregate 2. While a single location of the three-phase interface A is described by way of example in FIG. 1, the three-phase interfaces are not limited to this example, and FIG. 1 also includes other three-phase interfaces of the aggregate 2, the binding material 3, and the pores 4.

In the porous material 1 according to the present embodiment, the "three-phase interfaces" are, strictly speaking, limited to areas where the aggregate 2a and 2b, the binding material 3, and the pores 4 intersect with one another as illustrated in FIG. 1, but in the specification, they are assumed to also include areas where the surfaces of the aggregate 2 are lightly covered with the binding material 3 and are in close proximity to the pores 4.

In the case of the porous material 1 according to the present embodiment, assuming that the aggregate 2 is solid and at least part of the binding material 3 is in a liquid state during firing at high temperature, the liquid binding material 3 adheres with a small contact angle to the surfaces (solid-phase surfaces) of the solid aggregate 2, and this condition is maintained until the completion of firing and cooling so as to obtain the microstructure as illustrated in FIG. 1.

In this way, some (or most) portions of the aggregate 2 are covered with the binding material 3. As a result, angular edge portions of the aggregate 2 are covered with the binding material 3, and somewhat rounded shapes appear as a whole. The pores 4 in contact with the aggregate 2 and the binding material 3 also have rounded edge shapes. Such a structure that includes many curved portions at, in particular, the three-phase interfaces of the aggregate 2, the binding material 3, and the pores 4 is expressed as the "smoothly bound" state in the specification.

Figure 4:
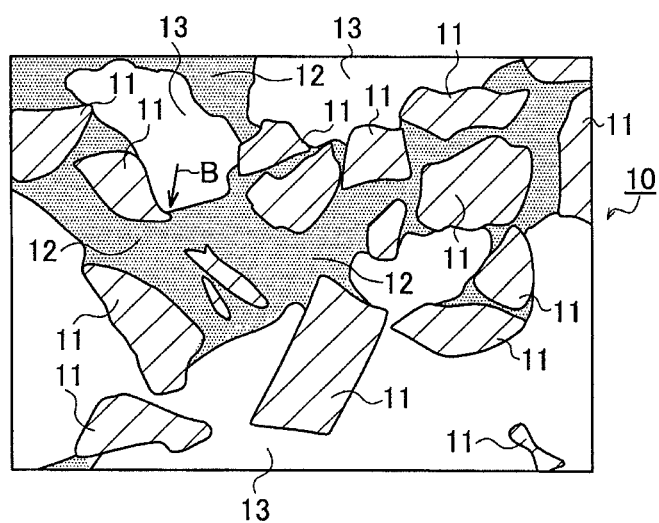
FIG. 4 illustrates a structure of a porous material according to a comparative example.
Figure 5:
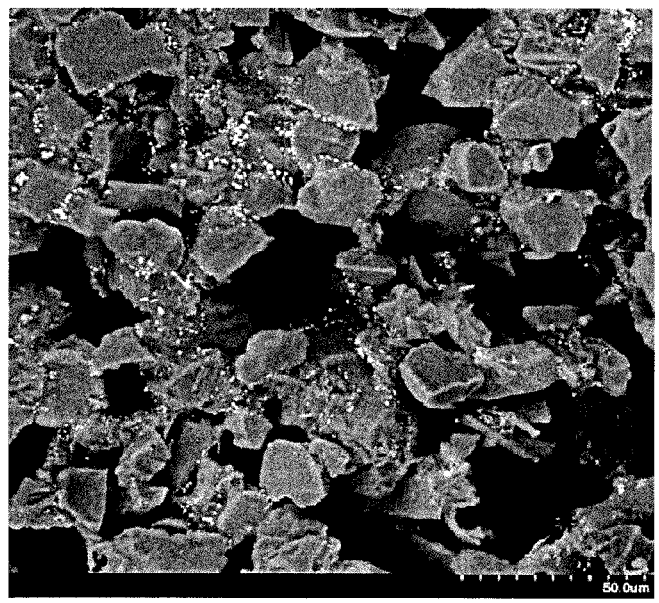
FIG. 5 illustrates a photograph of the porous material according to the comparative example.
Figure 6:
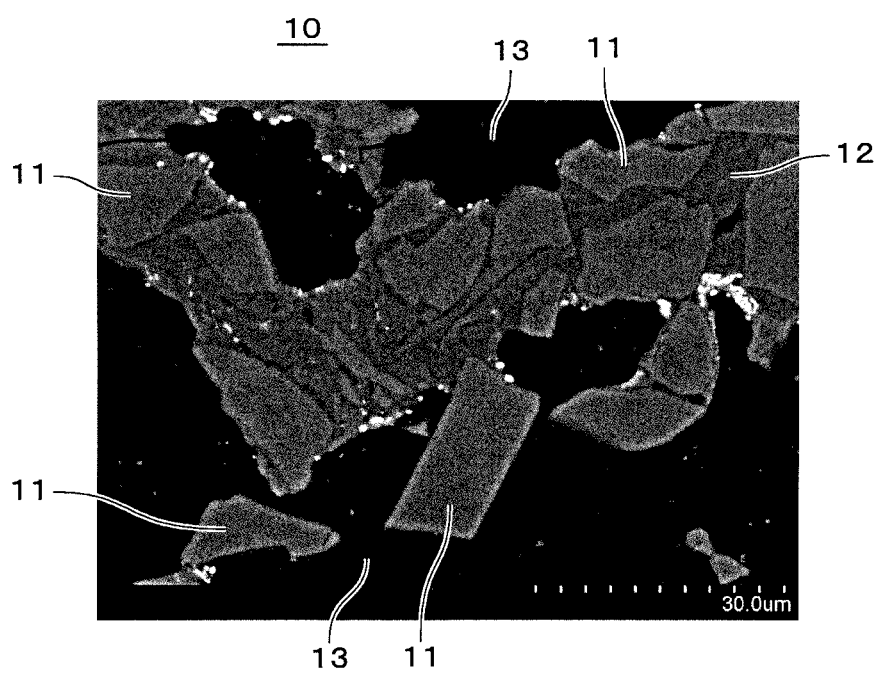
FIG. 6 illustrates a photograph of the porous material according to the comparative example.

FIG. 4 schematically illustrates a structure of a porous material 10 according to a comparative example. FIGS. 5 and 6 illustrate the porous material 10 that is actually produced according to the comparative example, both illustrating photographs taken with a scanning electron microscope. FIGS. 5 and 6 correspond respectively to FIGS. 2 and 3. The porous material 10 according to the comparative example differs from the porous material 1 in FIG. 1 in that its binding material 12 does not contain an Sr component.

In the case of a cross-sectional microstructure of the porous material 10 according to the comparative example, an angular aggregate 11 with linear sharp edges is observed just as it is, and the binding material 12 that binds particles of the aggregate 11 together extends in a linear shape in the vicinity of a three-phase interface B (see the arrow in FIG. 4) of one particle of the aggregate 11, the binding material 12, and a pore 13 toward another particle of the aggregate 11. Thus, this is not in a "smoothly bound" state as defined above. Moreover, most (e.g., 50% or more) of the surfaces of the aggregate 11 is in contact with the pores 13, and this is different from the porous material 1 according to the present embodiment in which most (e.g., 50% or more) of the surfaces of the aggregate 2 is covered with the binding material 3, and the pores 4 are in contact with the binding material 3.

That is, in the case of the porous material 10 according to the comparative example, the binding material 12 does not have a curved shape in the vicinity of the interfaces with the aggregate 11; the aggregate 11 and the pores 13 also do not have rounded shapes; and many of them are configured angularly or linearly or in irregular shapes, as compared with the porous material 1 according to the present embodiment. The porous material 1 according to the present embodiment greatly differs in microstructure from the porous material 10 according to the comparative example.

The porous material 1 according to the present embodiment is expected to have smoothly bound three-phase interfaces of the aggregate 2, the binding material 3, and the pores 4 and to have a large area of contact between the aggregate 2 and the binding material 3. As a result, the bonding force between the aggregate 2 and the binding material 3 increases, and this increase in the bonding force at each interface between each of the aggregate 2 and the binding material 3 leads to an increase in the strength (mechanical strength) of the porous material 1 as a whole.

The porous material 1 having a "smoothly bound" microstructure as illustrated in FIG. 1 can relieve stress concentration applied to edge portions by its curved shape, as compared with the porous material 10 (see FIG. 4) having a microstructure with sharp edges. Accordingly, the strength of the porous material 1 as a whole increases.

Figure 7A:
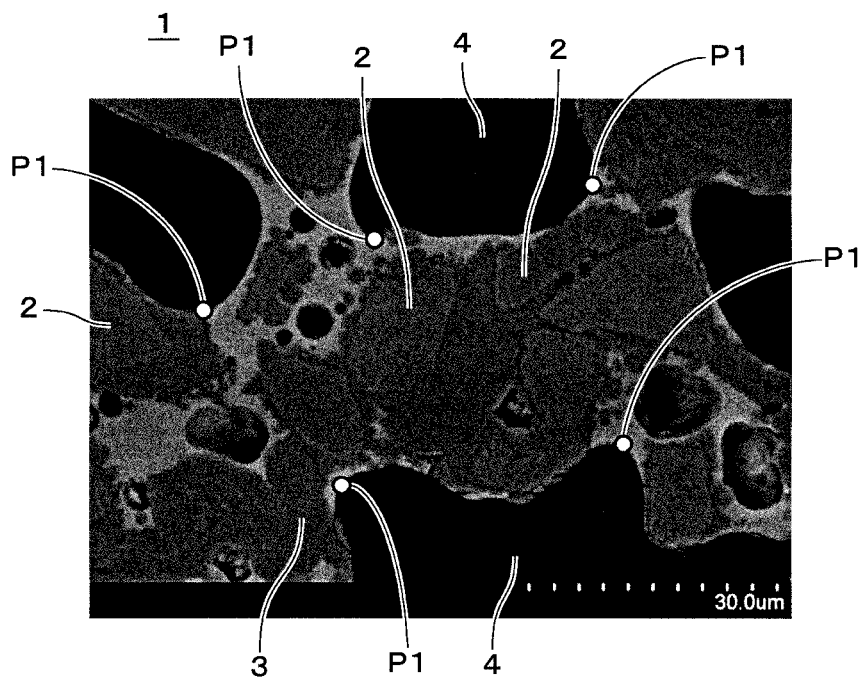
FIG. 7A is a diagram describing a measurement of the angle of rise.

The quantification of the above-described microstructure of the porous material 1 will now be described. In the porous material 1, boundary lines between the binding material 3 and the pores 4 (hereinafter, simply referred to as "edges of the binding material") have rounded shapes as viewed in an image of a mirror-polished cross-section. Thus, in one example of the quantification of the above-described microstructure, the rounding of the edges of the binding material 4 is converted into numbers. More specifically, first, a cross-section obtained by mirror-polishing the porous material 1 contained in a resin is photographed at a magnification of 1500 times with a scanning electron microscope so as to obtain an image (reflected electron image) illustrated in FIG. 7A. The magnification of the image may be appropriately changed.

Then, a measurement position P1 on an edge of the binding material 3 is specified in the image. The measurement position P1 is a position at which the curvature is locally a maximum on the edge of the binding material 3. In the above-described microstructure of the porous material 1, the edge of the binding material 3 that binds two particles of the aggregate 2 together has a concave shape between the vicinity of the three-phase interface with one particle of the aggregate 2 and the vicinity of the three-phase interface with the other particle of the aggregate 2. Between these three-phase interfaces, typically, the inclination of the edge of the binding material 3 changes continuously and there are few angular portions. One example of the measurement position P1 is a position that has a maximum curvature between those three-phase interfaces on the edge of the binding material 3. In the porous material 10 according to the comparative example, the edges of the binding material 12 do not have rounded shapes, and therefore a top of a recessed portion on an edge of the binding material 12 is specified as a measurement position P1.

Figure 7B:
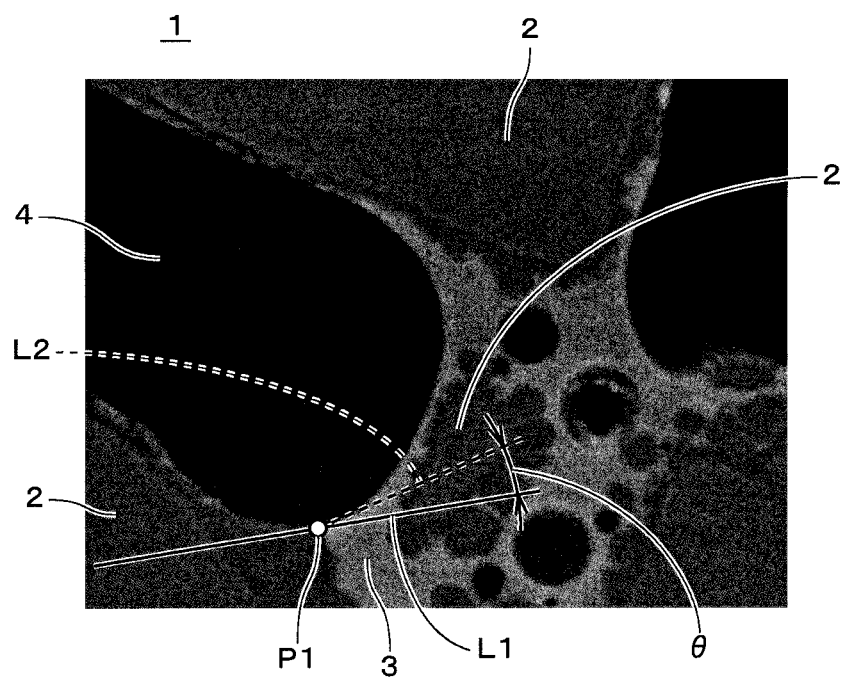
FIG. 7B is a diagram describing the measurement of the angle of rise.

Then, a straight line that indicates a direction tangent to the edge of the binding material 3 at the measurement position P1 is set as a reference line L1 as illustrated in FIG. 7B. In the vicinity of the measurement position P1, a straight line that rises from the measurement position P1 toward one side along the edge of the binding material 3 is set as a rising line L2. The rising line L2 is, for example, a straight line that connects the measurement position P1 and a position that is spaced toward one side by a predetermined infinitesimal distance (e.g., 1 to 5 µm) from the measurement position P1, on the edge of the binding material 3. Then, the angle formed by the reference line L1 and the rising line L2 is acquired as the angle of rise $\theta$. In this way, the angle of rise $\theta$ indicates an angle at which an edge of the binding material 3 in a given cross-section of the porous material 1 rises from the measurement position P1 at which the curvature is locally a maximum, with respect to a direction tangent to the edge at the measurement position P1.

For example, a plurality of angles of rise $\theta$ are obtained by specifying a plurality of measurement positions P1, and an average value of these angles is obtained as a representative value for the angle of rise on the edge. With the porous material 1 having the above-described microstructure, the representative value for the angle of rise is typically greater than 0 degrees and less than or equal to 25 degrees. On the other hand, with the porous material 10 according to the comparative example, the representative value for the angle of rise is greater than 25 degrees because the edges of the binding material 12 do not have rounded shapes and tops of recessed portions on edges of the binding material 12 are specified as measurement positions P1. The representative value for the angle of rise may be a median value or other values, instead of the average value. The number of measurement positions P1 to be specified in obtaining the representative value for the angle of rise is preferably larger than or equal to 5 (e.g., smaller than or equal to 100).

In the porous material 1 according to the present embodiment, the above-described microstructure is obtained by including the Sr component 5 in the binding material 3, which is used to bind the aggregate 2 together. In the porous material 1, the smoothly bound state of the surfaces at the three-phase interfaces of the aggregate 2, the binding material 3, and the pores 4 does not necessarily have to be clear. In other words, it can also be expected that the aforementioned smoothly bound state of the surfaces at the three-phase interfaces may be unclear, depending on factors such as the ratio of the mass of the binding material 3 to the mass of the porous material 1 and the particle diameter of the aggregate 2. Even in this case, the porous material 1 that includes the aforementioned Sr component 5 in the binding material can have improved mechanical strength.

As a strontium source of the Sr component 5, various types of oxides such as strontium carbonate ($SrCO_3$), strontium oxide (SrO), and strontium hydroxide ($Sr(OH)_2$) or various types of strontium salts can be used, for example. Alternatively, a plurality of types of strontium sources may be used. Typically, the smoothly bound state of the surfaces at the three-phase interfaces can be achieved by including a prescribed ratio of the Sr component 5 in the binding material 3. As a result, the high-strength porous material 1 having a microstructure as described above can be obtained.

As described previously, the ratio of the mass of the Sr component 5 contained in the binding material 3 in terms of SrO is set in the range of 0.3 to 15.0 mass % of the whole binding material 3. If the ratio of the mass of the Sr component 5 in terms of SrO is less than 0.3 mass %, there are only poor effects of the Sr component 5, and it is difficult to achieve the "smoothly bound" state at the three-phase interfaces between the aggregate 2 and the binding material 3.

On the other hand, if the ratio of the mass of the Sr component 5 in terms of SrO is greater than 15.0 mass %, it can be expected that the amount of the binding material 3 to be liquefied during firing will increase excessively. As described previously, the binding material 3 that is exposed to a high firing temperature during firing is assumed to be liquefied in part. Thus, if a large part of the binding material 3 is liquefied, part of the liquefied binding material 3 may cause foaming. Thereby, gas bubbles are more likely to occur due to the foaming in the binding material 3, and a plurality of cavities (not shown) may be generated in the binding material 3 as a result of the binding material being cooled and solidified. As a result, the bonding force between the aggregate 2 and the binding material 3 may decrease and accordingly the strength of the porous material 1 may decrease due to the cavities generated between the aggregate 2 and the binding material 3. Hence, the ratio of the mass of the Sr component 5 contained in the binding material 3 is set in the above numerical range. From the viewpoint of stably obtaining the high-strength porous material 1, the ratio of the mass of the Sr component 5 is preferably in the range of 0.5 to 12.0 mass % of the whole binding material 3, and more preferably in the range of 1.0 to 8.0 mass %. It is also possible to define the ratio of the mass of the Sr component 5 to the mass of the whole porous material 1. In this case, the ratio of the mass of the Sr component 5 in terms of SrO is in the range of 0.01 to 5.5 mass %. The ratio of the mass of the Sr component 5 is preferably in the range of 0.1 to 5.0 mass % of the whole porous material 1, and more preferably in the range of 0.3 to 3.0 mass %.

In one example of the porous material 1, at least part of the Sr component 5 contained in the binding material 3 exists as $SrAl_2Si_2O_8$. The ratio of the mass of $SrAl_2Si_2O_8$ is preferably greater than or equal to 0.1 mass % of the whole porous material 1, and more preferably greater than or equal to 0.5 mass %. The ratio of the mass of $SrAl_2Si_2O_8$ is, for example, less than or equal to 10.0 mass %. The binding material 3 does not necessarily have to contain an $SrAl_2Si_2O_8$ phase, and the Sr component 5 may be solid-dissolved in other crystalline phases of the binding material 3. As a matter of course, the Sr component 5 may be contained in a plurality of types of crystalline phases, or may be contained in an amorphous phase.

As described previously, the binding material 3 contains 5.0 to 15.0 mass % of the MgO component, 30.0 to 60.0 mass % of the $Al_2O_3$ component, and 30.0 to 55.0 mass % of the $SiO_2$ component with respect to the mass of the whole binding material 3. In a preferable example of the porous material 1, the binding material 3 contains 50 mass % or more of cordierite with respect to the mass of the whole binding material 3, i.e., the binding material 3 is composed primarily of cordierite. The upper-limit value for the ratio of the mass of cordierite to the mass of the whole binding material 3 is, for example, 99.7 mass %. The ratio of the mass of the amorphous component contained in the binding material 3 is preferably less than 50 mass %. In the porous material 1, the binding material 3 may contain components other than the Sr component 5, MgO, $Al_2O_3$, and $SiO_2$. For example, the binding material 3 may contain cerium dioxide ($CeO_2$). It is also possible to define the ratios of the masses of the MgO component, the $Al_2O_3$ component, and the $SiO_2$ component to the mass of the whole porous material 1. In this case, the porous material 1 preferably contains 0.1 to 10.0 mass % of the MgO component, 0.5 to 25.0 mass % of the $Al_2O_3$ component, and 5.0 to 45.0 mass % of the $SiO_2$ component with respect to the mass of the whole porous material 1. Note that part of the above components may be derived from the aggregate 2. In one example of the porous material 1, part of the $SiO_2$ component is derived from oxide films, which will be described later, included in the aggregate 2.

In the porous material 1 according to the present embodiment, typically, the aggregate 2 and the binding material 3 have the above-described microstructure by including the Sr component 5 in the binding material 3 as described above, and this increases the strength of the porous material 1 as a whole. The bending strength is at least 5.5 MPa or more. Thus, when the porous material 1 is used to prepare other products such as catalyst carriers, the products will have adequate strength in practice. Note that the bending strength can be measured and evaluated by, for example, preparing specimens having dimensions of 0.3 mm×4 mm×20 to 40 mm and conducting, for example, a three-point bending test compliant with JIS R1601 on the specimens.

The lower-limit value for the average pore diameter of the porous material 1 according to the present invention is preferably 10 μm, and more preferably 15 μm. The upper-limit value for the average pore diameter is preferably 40 μm, and more preferably 30 μm. If the average pore diameter is less than 10 μm, pressure loss may increase. If the average pore diameter exceeds 40 μm, for example when the porous material according to the present invention is used as a filter such as a DPF, part of particulate matter in exhaust gases may pass through the filter without being collected. In the specification, the average pore diameter is a value measured by mercury porosimetry (compliant with JIS R1655).

In the porous material 1 according to the present invention, it is preferable that the ratio of pores with pore diameters less than 10 μm is less than or equal to 20% of all pores, and the ratio of pores with pore diameters greater than 40 µm is less than or equal to 10% of all pores. If the ratio of pores with pore diameters less than 10 µm exceeds 20% of all pores, pressure loss may easily increase because the pores with pore diameters less 10 µm easily get clogged when a catalyst is supported. If the ratio of pores with pore diameters greater than 40 µm exceeds 10% of all pores, it may become difficult for, for example, a DPF to adequately perform a filtering function because the pores with pore diameters greater than 40 µm easily pass particulate matter therethrough.

In the case of preparing a honeycomb-shaped honeycomb structure (not shown) using the porous material 1, the honeycomb structure is desirably configured to have a strength (honeycomb bending strength) of at least 4.0 MPa or more. In this case, products such as catalyst carriers and DPFs can be constructed using the honeycomb structure with adequate strength and can withstand use under harsh usage environments, such as under high dynamic loads. It is also possible to satisfy a demand to increase the size of honeycomb structures.

The aggregate 2 of the porous material 1 according to the present embodiment include particle bodies. The particle bodies are typically composed of one kind of substance. The particle bodies are, for example, silicon carbide (SiC) particles. Instead of silicon carbide, the substance composing the particle bodies may, for example, be silicon nitride ($Si_3N_4$), aluminum nitride (AlN), titanium carbide (TiC), titanium nitride (TiN), mullite ($Al_6Si_2O_{13}$), alumina ($Al_2O_3$), aluminum titanate ($Al_2TiO_5$), magnesium titanate ($MgTi_2O_5$), or zircon ($ZrSiO_4$). For example, the particle bodies of the aggregate 2 are particles of the most abundant substance among substances that compose the porous material 1.

When a non-oxide material is used for the particle bodies, the aggregate 2 may include oxide films provided on (or may be regarded as "around") surfaces of the particle bodies. Preferably, each of the aggregate 2 is composed of a particle body, or composed of a particle body and an oxide film. The oxide films as used herein refer to oxide layers formed on the surfaces of the particle bodies through heat treatment in an oxidizing atmosphere when a non-oxide material is used for the particle bodies. When the particle bodies of the aggregate 2 are SiC or $Si_3N_4$ particles, it is preferable for the aggregate 2 to include the oxide films described above. The oxide films preferably each contain a cristobalite phase, and preferably contain $SiO_2$. The thickness of the oxide films is, for example, in the range of 0.3 to 5.0 µm, and preferably in the range of 0.5 to 3.0 µm. The ratio of the mass of cristobalite is, for example, in the range of 3.0 to 25.0 mass % of the whole porous material 1, and preferably in the range of 7.0 to 20.0 mass %. For example, when the porous material 1 is used as a catalyst carrier for purifying vehicle emission, the presence of the oxide films on surfaces of the particle bodies helps obtain excellent oxidation resistance.

The following description takes the example of the case where the porous material 1 and the honeycomb structure (not shown) formed of the porous material 1 according to the present embodiment primarily use SiC particles as the particle bodies of the aggregate 2. Even in the case where the particle bodies of the aggregate 2 are composed of other particles such as $Si_3N_4$ particles, various conditions of the porous material 1 and the honeycomb structure can be made the same conditions.

The porous material 1 used for the honeycomb structure is required to have high porosity (here, open porosity) and high strength. In order for the porous material 1 to easily achieve high porosity, the average particle diameter of the aggregate 2 is preferably greater than or equal to 5 µm, and more preferably greater than or equal to 10 µm. In order to avoid the presence of many excessively large pores 4 in the porous material 1, the average particle diameter of the aggregate 2 is preferably less than or equal to 100 µm, and more preferably less than or equal to 40 µm. The average particle diameter can be measured by a laser diffraction method (the same applies hereinafter).

Besides, in the porous material according to the present embodiment, a total content (the ratio of the total mass) of alkali metal components in terms of an oxide is set to be less than 0.1 mass % (greater than or equal to 0 mass %) of the whole porous material 1, the alkali metal components including sodium (Na) and potassium (K) contained in the fired porous material 1. The alkali metal components such as sodium or potassium exist in trace amounts within an aggregate raw material for use in forming the aggregate 2 and a raw material of binding material for use in forming the binding material 3.

The alkali metal components such as sodium are generally known to become a cause of deterioration in the long-term durability of porous materials. Thus, attempts are being made to reduce the amount of the alkali metal components contained in the porous material as much as possible. In view of this, in the porous material 1 according to the present embodiment, the (total) content of the alkali metal components such as sodium contained in the fired porous material 1 is set in the above-described range. This composition increases the long-term durability of the porous material 1.

It is also known that if the porous material 1 (honeycomb structure) contains alkali metal components when an SCR catalyst such as zeolite is supported by the porous material 1 for use, NOx purification performance deteriorates due to aging (heat treatment) at high temperature. However, the deterioration in NOx purification performance due to aging can be suppressed if the content (ratio of the mass) of the alkali metal components in terms of an oxide is less than 0.1 mass %.

Here, if the Sr component is not contained in the binding material when the content of the alkali metal components (in terms of an oxide) is set to be less than 0.1 mass %, the aforementioned three-phase interfaces are not smoothly bound as in the case of the previously described porous material 10 according to the comparative example, and therefore the strength of the porous material decreases. In contrast, the porous material 1 according to the present embodiment can ensure high strength by including the Sr component in the binding material 3 when the content of the alkali metal components is set to be less than 0.1 mass %.

As described previously, in one example of the porous material 1, $SrAl_2Si_2O_8$ is generated from the Sr component by firing, but if the content of the alkali metal components is set to be greater than or equal to 0.1 mass %, the alkali metal components can easily form an amorphous phase with the components of the binding material including the Sr component, and accordingly the Sr component is also easily included in the amorphous phase. When the content of the alkali metal components is set to be less than 0.1 mass %, an amorphous phase cannot be formed easily, and this suppresses the inclusion of the Sr component of the binding material in the amorphous phase. As a result, a crystalline phase of $SrAl_2Si_2O_8$ is easily formed.

It is generally known that the bending strength of the porous material 1 and the honeycomb bending strength of the honeycomb structure are affected by the porosity (open porosity) of the porous material 1 itself. In view of this, in the porous material 1 and the honeycomb structure formed of the porous material 1, the lower-limit value for the open porosity is preferably 40%, and more preferably 50%. On the other hand, the upper-limit value for the open porosity is preferably 90%, and more preferably 70%. If the open porosity is lower than 40%, pressure loss increases, and this increase greatly affects product performance when the porous material 1 and the honeycomb structure are used as products such as DPFs. On the other hand, when the open porosity is higher than or equal to 50%, the porous material 1 and the honeycomb structure have a property of low pressure loss and are, in particular, suitable for use as products such as DPFs.

If the open porosity exceeds 90%, the strength of the porous material 1 decreases, and the porous material 1 and the honeycomb structure cannot ensure adequate strength in practice when used as products such as DPFs. On the other hand, the porous material 1 and the honeycomb structure with an open porosity of 70% or less are, in particular, suitable for use as products such as DPFs. The details of the method for calculating the open porosity will be described later.

(2) Honeycomb Structure

The honeycomb structure (not shown) according to the present invention is constituted by using the aforementioned porous material 1 according to the present embodiment. The honeycomb structure includes partition walls that partition off and form a "plurality of cells extending from one end surface to the other end surface." That is, the honeycomb structure is a tubular member having an interior partitioned into a plurality of cells by the partition walls. The cells function as fluid paths. The features of the honeycomb structure, such as composition and shape, are already known, and honeycomb structures of any given composition and size can be constructed by using the porous material 1 according to the present embodiment. For example, the honeycomb structure may be structured to have an outer wall on the outermost perimeter. The lower-limit value for the thickness of the partition walls is, for example, preferably 30 μm, and more preferably 50 μm. The upper-limit value for the thickness of the partition walls is preferably 1000 μm, more preferably 500 μm, and especially preferably 350 μm. The lower-limit value for the density of cells is preferably 10 cells/cm$^2$, more preferably 20 cells/cm$^2$, and especially preferably 50 cells/cm$^2$. The upper-limit value for the density of cells is preferably 200 cells/cm$^2$, and more preferably 150 cells/cm$^2$.

There are no particular limitations on the shape of the honeycomb structure, and examples of the shape include columnar shapes as well known in the art and prism shapes having a polygonal (e.g., triangular, quadrangular, pentagonal, or hexagonal) bottom surface. In addition, there are no particular limitations on the shape of the cells of the honeycomb structure. Examples of the shape of the cells in a cross-section orthogonal to the direction of extension of the cells (axial direction) include polygonal shapes (e.g., triangular, quadrangular, pentagonal, hexagonal, heptagonal or octagonal shape), circular shapes, and a combination of these shapes.

Additionally, the dimensions of the honeycomb structure can be appropriately determined according to the application. The honeycomb structure according to the present embodiment is constituted by using the porous material 1 with a property of high strength according to the present embodiment and therefore, in particular, has high resistance to dynamic loads. Thus, it is possible to constitute large-sized honeycomb structures for constructing large-sized DPFs or the like. For example, honeycomb structures having volumes of approximately 10 cm$^3$ to 2.0×10$^4$ cm$^3$ are conceivable.

As described previously, the honeycomb structure according to present embodiment can be used as a DPF or a catalyst carrier. A DPF that supports a catalyst is also a preferable embodiment. When the honeycomb structure according to the present embodiment is used as, for example, a DPF, the structure is preferably as follows. Specifically, it is preferable for the honeycomb structure to include plugging parts that are provided in the openings of predetermined cells at one end surface and in the openings of the remaining cells at the other end surface. It is preferable that, at each end surface, cells with plugging parts and cells with no plugging parts are alternately arranged, forming a checkered pattern.

(3) Method for Manufacturing Porous Material (Honeycomb Structure)

Figure 8:
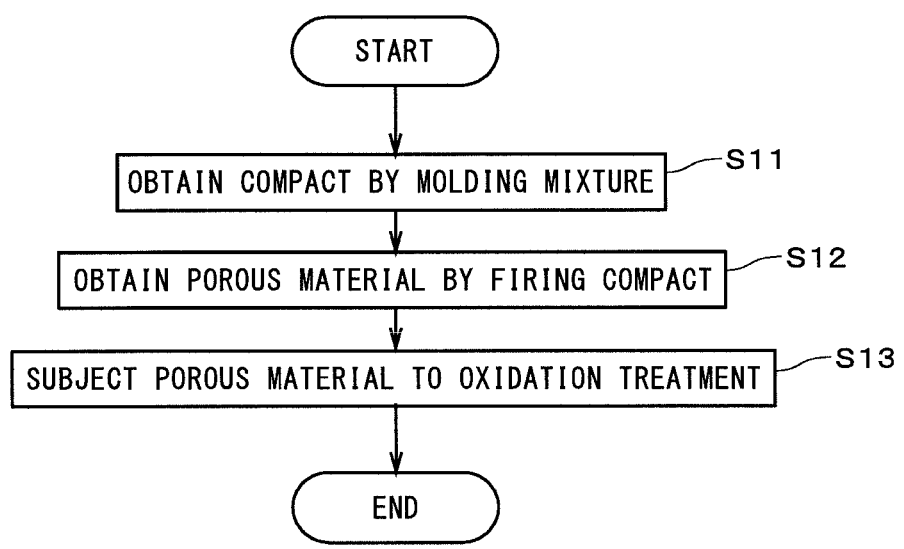
FIG. 8 is a flowchart of processing for producing the porous material.

The method of producing a porous material according to the present invention will now be described hereinafter. FIG. 8 is a flowchart of processing for producing the porous material 1. The method of producing a porous material described below is also a method of producing a honeycomb-shaped honeycomb structure composed of a porous material.

First, powdered silicon carbide that is a raw material for the aggregate 2 and a powdered raw material of binding material for use in generating the binding material 3 by firing are mixed, and other components such as a binder, a surface-active agent, a pore forming material, and water are further added as necessary to prepare a molding raw material (molding-raw-material preparation process). Preferably, raw materials that contain few alkali metal components as impurities are used. At this time, powdered strontium (e.g., strontium carbonate) or the like that is contained with a prescribed content in the water to be added is added (contained) as the Sr component 5 to the molding raw material. The method for adding the Sr component 5 is not limited to the technique described above, and the Sr component 5 may be directly charged in a powdered state into silicon carbide or the raw material of binding material in the same manner as the other components such as the binder. To be precise, the Sr component 5 is also part of the raw material of binding material. As described previously, the binding material 3 may contain other components such as cerium dioxide ($CeO_2$), and in this case, the other components such as cerium dioxide are also part of the raw material of binding material.

The raw material of binding material contains an aluminum (Al) component, a silicon (Si) component, and a magnesium (Mg) component, and typically contains aluminum oxide ($Al_2O_3$), silicon dioxide ($SiO_2$), and magnesium oxide (MgO). In a preferable example of production, "cordierite" that is a major component of the binding material 3 is generated by firing the above raw material of binding material. Various components are usable as a cordierite raw material for use in generating a cordierite crystal by firing. Assuming that the total mass of the aggregate raw material and the raw material of binding material (i.e., inorganic raw materials) in the molding raw material is 100 mass %, the ratio of the mass of the raw material of binding material is, for example, in the range of 8 to 70 mass %. The ratio of the aluminum component in terms of aluminum oxide in the raw material of binding material is, for example, in the range of 30 to 75 mass %. Similarly, the ratio of the silicon component in terms of silicon dioxide is, for example, in the range of 28 to 55 mass %. The ratio of the magnesium component in terms of magnesium oxide is, for example, in the range of 5 to 15 mass %. The ratio of the Sr component 5 in terms of SrO in the raw material of binding material is, for example, in the range of 0.1 to 15 mass %.

Examples of the binder include well-known organic binders such as methylcellulose, hydroxypropoxyl cellulose, hydroxyethylcellulose, carboxymethyl cellulose, and polyvinyl alcohol. In particular, it is preferable to use both methylcellulose and hydroxypropoxyl cellulose. The binder content in the whole molding raw material is, for example, preferably in the range of 2 to 10 mass %.

Examples of the surface-active agent include ethylene glycol, dextrin, fatty acid soap, and polyalcohol. Among these examples, only one kind may be used singularly, or two or more kinds may be used in combination. For example, the content of the surface-active agent in the whole molding raw material is preferably less than or equal to 2 mass %.

There are no particular limitations on the pore forming material, as long as the pore forming material forms pores after firing, and examples of the pore forming material include graphite, starch, a foam resin, a water-absorbing resin, and silica gel. For example, the content of the pore forming material in the whole molding raw material is preferably less than or equal to 40 mass %. The lower-limit value for the average particle diameter of the pore forming material is preferably 10 µm, and in particular, the upper-limit value for the average particle diameter of the pore forming material is preferably 30 µm. If the average particle diameter of the pore forming material is less than 10 µm, holes (pores 4) may not be formed adequately in the porous material 1. On the other hand, if the average particle diameter of the pore forming material is greater than 30 µm, the molding raw material (raw mixture) may get clogged in a mouthpiece used in extrusion molding. The aforementioned average particle diameter of the pore forming material can be measured by, for example, a laser diffraction method. When a water-absorbing resin is used as the pore forming material, the average particle diameter is a value obtained by measuring the water-absorbing resin after water absorption.

The water to be added to the molding raw material can be appropriately adjusted so as to obtain hardness of a raw mixture that can be easily molded during, for example, extrusion molding. For example, it is preferable to add 20 to 80 mass % of water with respect to the mass of the whole molding raw material.

Next, the aforementioned molding raw material obtained by charging each component in a predefined amount is kneaded into the raw mixture. At this time, a device such as a kneader or a vacuum clay kneader may be used to form the raw mixture.

Thereafter, the kneaded raw mixture is subjected to extrusion molding to form a honeycomb compact (compact forming process). The extrusion molding of the raw mixture mainly uses an extruder equipped with a mouthpiece having desired properties such as overall shape, cell shape, partition wall thickness, and cell density. The material for the mouthpiece is preferably hard metal that is hard to wear. The honeycomb compact is structured to include porous partition walls and an outer wall, the porous partition walls partitioning off and forming a plurality of cells that serve as fluid paths, and the outer wall being located on the outermost perimeter. The properties of the honeycomb compact such as the thickness of the partition walls, the density of cells, and the thickness of the outer wall may be appropriately determined in consideration of shrinkage during drying and firing and in accordance with the composition of the honeycomb structure to be prepared. As described above, the compact is obtained by molding the mixture of the aggregate raw material, the raw material of binding material, and the pore forming material (step S11).

The honeycomb compact obtained as described above is preferably dried before a firing process (dry process). There are no particular limitations on the method of drying, and examples of the method include electromagnetic-wave heating methods such as drying by microwave heating and drying by high-frequency dielectric heating, and external heating methods such as hot air drying and superheated steam drying. The electromagnetic-wave heating methods and the external heating methods may be used in combination. For example, in order to rapidly and uniformly dry the whole compact while preventing the occurrence of cracking, two-step drying may be conducted, in which first an electromagnetic-wave heating method is used to dry a certain amount of moisture, and then an external heating method is used to dry the remaining moisture. In this case, as drying conditions, it is preferable to first use the electromagnetic-wave heating method to remove 30 to 99 mass % of moisture with respect to the amount of moisture before drying, and then use the external heating method to further reduce moisture to 3 mass % or less. A preferable electromagnetic-wave heating method is drying by dielectric heating, and a preferable external heating method is hot air drying.

If the dried honeycomb compact does not have a desired length (honeycomb length) in the direction of extension of the cells (axial direction) in the honeycomb compact, the honeycomb compact may be cut to a desired length by cutting both end surfaces (both ends) of the honeycomb compact (curing process). There are no particular limitations on the method of cutting, and one example of the method is using a well-known circular saw cutter.

Then, the honeycomb compact is fired so that a porous material that is a fired compact is obtained as a honeycomb structure (step S12). Here, calcination is preferably conducted before firing in order to remove the binder or other components (calcination process). Calcination is preferably conducted at a temperature of 200 to 600° C. for 0.5 to 20 hours in the ambient atmosphere (degreasing process). Firing is preferably conducted in a non-oxidizing atmosphere such as nitrogen or argon (with an oxygen partial pressure of $10^{-4}$ atm or less) (firing process). The lower-limit value for the firing temperature is preferably 1300° C. The upper-limit value for the firing temperature is preferably 1600° C. The pressure during firing is preferably atmospheric pressure. The lower-limit value for the firing time is preferably one hour. The upper-limit value for the firing time is preferably 20 hours.

Preferably, the porous material is subjected to heat treatment (oxidation treatment) in an oxidizing atmosphere after the firing process (step S13). The oxidizing atmosphere is, for example, ambient atmosphere (which may contain water vapor). As described previously, in this example of production, the aggregate raw material contains SiC particles, and the oxide films are formed on SiC surfaces exposed to the pores by the oxidation treatment. Thus, the porous material can obtain excellent oxidation resistance when used as a catalyst carrier such as a DPF for purifying vehicle emission. In some cases, the oxide films may be formed on portions of the SiC surfaces that are covered with the binding material. The lower-limit value for the temperature of the oxidation treatment is preferably 1100° C., and more preferably 1200° C. The upper-limit value for the temperature of the oxidation treatment is preferably 1400° C., and more preferably 1350°

C. The lower-limit value for the oxidation treatment time is preferably one hour. The upper-limit value for the oxidation treatment time is preferably 20 hours. The calcination, firing, and oxidation treatment may be conducted using, for example, an electric furnace or a gas furnace.

Next, examples will be described. Here, porous materials (honeycomb structures) were prepared as Examples 1 to 15 and Comparative Examples 1 to 4 under the conditions shown in Table 1.

Then, the obtained raw mixture (molding raw material) was molded into a cylindrical shape (cylinder shape) by a vacuum clay kneader, and the obtained cylindrical raw mixture was charged into an extruder so as to obtain a honeycomb-shaped honeycomb compact by extrusion molding. The obtained honeycomb compact was dried in two steps, i.e., dried first with microwaves and then with hot air at 80° C. for 12 hours by a hot-air drier, so as to obtain a honeycomb dried compact that was not fired.

TABLE 1

| | Type of Aggregate Raw Material | Particle Diameter of Aggregate Raw Material μm | Ratio of Aggregate Raw Material SiC/ mass % | Ratio of Raw Material of Binding Material mass % | Composition of Raw Material of Binding Material | | | | | Total Mass mass % | Firing Temperature ° C. | Firing Atmosphere | Oxidation Temperature ° C. |
|---|---|---|---|---|---|---|---|---|---|---|---|---|---|
| | | | | | MgO/ mass % | SiO$_2$/ mass % | Al$_2$O$_3$/ mass % | CeO$_2$/ mass % | SrO/ mass % | | | | |
| Example 1 | SiC | 20 | 75.0 | 25.0 | 9.7 | 44.4 | 41.6 | 2.9 | 1.4 | 100.0 | 1400 | Ar | 1270 |
| Example 2 | | 20 | | | 9.6 | 43.8 | 41.0 | 2.9 | 2.7 | 100.0 | | Ar | 1270 |
| Example 3 | | 20 | | | 9.6 | 43.8 | 41.0 | 2.9 | 2.7 | 100.0 | | Ar | 1210 |
| Example 4 | | 20 | | | 9.4 | 42.6 | 39.9 | 2.8 | 5.3 | 100.0 | | Ar | 1270 |
| Example 5 | | 20 | | | 9.9 | 45.1 | 42.2 | 0.0 | 2.8 | 100.0 | | Ar | 1270 |
| Example 6 | | 15 | | | 9.6 | 43.8 | 41.0 | 2.9 | 2.7 | 100.0 | | Ar | 1210 |
| Example 7 | | 15 | | | 9.6 | 43.8 | 41.0 | 2.9 | 2.7 | 100.0 | | Ar | 1310 |
| Example 8 | | 15 | | | 9.6 | 43.8 | 41.0 | 2.9 | 2.7 | 100.0 | 1350 | Ar | 1270 |
| Example 9 | | 15 | | | 9.6 | 43.8 | 41.0 | 2.9 | 2.7 | 100.0 | 1450 | Ar | 1270 |
| Example 10 | | 30 | | | 9.9 | 45.1 | 42.2 | 0.0 | 2.8 | 100.0 | 1350 | Ar | 1310 |
| Example 11 | | 20 | 90.9 | 9.1 | 9.6 | 43.8 | 41.0 | 2.9 | 2.7 | 100.0 | 1400 | Ar | 1270 |
| Example 12 | | 20 | 66.7 | 33.3 | 9.6 | 43.8 | 41.0 | 2.9 | 2.7 | 100.0 | | Ar | 1270 |
| Example 13 | | 20 | 75.0 | 25.0 | 9.0 | 35.3 | 50.4 | 2.7 | 2.6 | 100.0 | | Ar | 1270 |
| Example 14 | | 20 | | | 9.6 | 43.8 | 41.0 | 2.9 | 2.7 | 100.0 | | Ar | — |
| Example 15 | | 20 | | | 9.9 | 45.1 | 42.2 | 0.0 | 2.8 | 100.0 | | Ar | — |
| Comparative Example 1 | | 20 | | | 9.9 | 45.0 | 42.2 | 2.9 | 0.0 | 100.0 | 1450 | Ar | 1270 |
| Comparative Example 2 | | 20 | | | 9.6 | 43.7 | 41.0 | 5.7 | 0.0 | 100.0 | 1450 | Ar | 1270 |
| Comparative Example 3 | | 20 | | | 8.2 | 37.4 | 35.1 | 2.4 | 16.9 | 100.0 | 1400 | Ar | 1270 |
| Comparative Example 4 | | 20 | | | 9.9 | 45.0 | 42.2 | 2.9 | 0.0 | 100.0 | 1400 | Ar | 1270 |

Examples 1 to 15 and Comparative Examples 1 to 4

First, "base powder" was prepared by mixing powdered silicon carbide (SiC) as an aggregate raw material and a powdered raw material of binding material. The ratio of the mass of the aggregate raw material in the base powder and the ratio of the mass of the raw material of binding material in the base powder (which are both the ratios of the masses to the mass of the whole base powder) are respectively as shown in "Ratio of Aggregate Raw Material" and "Ratio of Raw Material of Binding Material" in Table 1. The ratio of the mass of each component contained in the raw material of binding material (the ratio of the mass to the mass of the whole raw material of binding material) is as shown in "Composition of Raw Material of Binding Material." Here, strontium carbonate (SrCO$_3$) was added as an Sr component, and Table 1 shows the ratio of the mass of the Sr component in terms of SrO.

Moreover, a water-absorbing resin and starch that serve as the pore forming material, hydroxypropyl methylcellulose that serves as the binder, and water were added to the above prepared base powder to form a "molding raw material." Assuming that the mass of the base powder is 100 mass %, 5.0 mass % of the water-absorbing resin, 28 mass % of starch, and 7.0 mass % of hydroxypropyl methylcellulose were added. Thereafter, the mixture was kneaded by a kneader into a plastic raw mixture (molding raw material).

After the obtained honeycomb dried compact was cut to a desired length (honeycomb length) by cutting both ends of the honeycomb dried compact, the honeycomb dried compact was subjected to degreasing treatment in which the compact was degreased at a heating temperature of 450° C. in the ambient atmosphere (calcination process); fired at a firing temperature of 1350° C. to 1450° C. in an inert gas atmosphere (argon gas atmosphere); and then subjected to oxidation treatment at a temperature of 1210° C. to 1310° C. in the air (see Table 1). As a result, the porous materials with honeycomb structures (simply, "honeycomb structures") of Examples 1 to 15 and Comparative Examples 1 to 4 were obtained.

In Examples 1, 2, and 4, only the addition amount of SrCO$_3$ was changed from each other. In Examples 3, only the temperature of the oxidation treatment was changed from Example 2, and Example 5 differs from Example 2 in that cerium dioxide (CeO$_2$) was not added. Examples 6 and 7 differ in the temperature of the oxidation treatment, and Examples 8 to 10 differ in the firing temperature. Example 10 omitted the addition of CeO$_2$ and increased the particle diameter (average particle diameter) of the aggregate raw material. Examples 11 and 12 respectively increased and decreased the ratio of the mass of the aggregate raw material, and Example 13 changed the composition ratio of the raw material of binding material. Examples 14 and 15 omitted the oxidation treatment and changed the presence or absence of CeO$_2$ added. Comparative Examples 1 and 2 omitted the addition of SrCO$_3$ and changed the addition amount of CeO$_2$. Comparative Example 3 increased the addition amount of SrCO$_3$ so that the amount of the Sr component exceeded the prescribed range. Comparative Example 4 omitted the addition of SrCO$_3$ and used raw materials having a high sodium (Na) content.

Various Measurements of Porous Materials

The ratio of the mass of each oxide component (SiO$_2$, MgO, Al$_2$O$_3$, CeO$_2$, and SrO) in the porous material, the ratio of the mass of each component (SiO$_2$, MgO, Al$_2$O$_3$, CeO$_2$, and SrO) in the binding material, the ratio of the mass of minor components (Na$_2$O and K$_2$O) in the porous material, the ratio of the mass of each crystalline phase (SiC, SiO$_2$ (cristobalite), cordierite, mullite, SrAl$_2$Si$_2$O$_8$ (monoclinic crystal), SrAl$_2$Si$_2$O$_8$ (hexaclinic crystal), and CeO$_2$) in the porous material, the presence or absence and thickness of the oxide films on aggregate particles, the open porosity, the honeycomb bending strength, the bending strength, and changes in NOx purification rate before and after heat treatment were measured or calculated for the prepared porous materials. Tables 2 and 3 show the measurement results for the porous materials of Examples 1 to 15 and Comparative Examples 1 to 4.

TABLE 2

| | Composition Ratio of Oxides | | | | | Composition Ratio of Binding Material | | | | | Minor Components | |
|---|---|---|---|---|---|---|---|---|---|---|---|---|
| | SiO$_2$ | MgO | Al$_2$O$_3$ | CeO$_2$ | SrO | SiO$_2$ | MgO | Al$_2$O$_3$ | CeO$_2$ | SrO | Na$_2$O | K$_2$O |
| | mass % | | | | | mass % | | | | | mass % | |
| Example 1 | 22.6 | 2.3 | 9.4 | 0.64 | 0.31 | 45.8 | 9.7 | 40.5 | 2.8 | 1.3 | 0.05 | <0.01 |
| Example 2 | 24.7 | 2.3 | 9.5 | 0.64 | 0.61 | 48.6 | 8.9 | 37.6 | 2.5 | 2.4 | 0.06 | <0.01 |
| Example 3 | 27.7 | 2.2 | 9.4 | 0.63 | 0.60 | 53.9 | 7.9 | 33.7 | 2.3 | 2.2 | 0.08 | <0.01 |
| Example 4 | 26.6 | 2.2 | 9.1 | 0.63 | 1.20 | 53.1 | 7.9 | 32.5 | 2.3 | 4.3 | 0.04 | <0.01 |
| Example 5 | 24.0 | 2.2 | 9.3 | 0.00 | 0.70 | 49.2 | 9.2 | 38.6 | 0.0 | 2.9 | 0.04 | <0.01 |
| Example 6 | 24.7 | 2.3 | 9.5 | 0.64 | 0.61 | 53.7 | 8.0 | 33.8 | 2.3 | 2.2 | 0.04 | <0.01 |
| Example 7 | 24.7 | 2.3 | 9.5 | 0.64 | 0.61 | 36.3 | 11.1 | 46.6 | 3.1 | 3.0 | 0.04 | <0.01 |
| Example 8 | 27.7 | 2.2 | 9.4 | 0.63 | 0.60 | 54.4 | 7.9 | 33.3 | 2.2 | 2.1 | 0.03 | <0.01 |
| Example 9 | 27.7 | 2.2 | 9.4 | 0.63 | 0.60 | 54.2 | 8.1 | 33.1 | 2.3 | 2.2 | 0.04 | <0.01 |
| Example 10 | 24.0 | 2.2 | 9.3 | 0.00 | 0.67 | 49.2 | 9.2 | 38.7 | 0.0 | 2.8 | 0.08 | <0.01 |
| Example 11 | 13.0 | 0.3 | 1.5 | 0.60 | 0.60 | 40.0 | 6.0 | 30.0 | 12.0 | 12.0 | 0.04 | <0.01 |
| Example 12 | 33.0 | 4.5 | 17.2 | 0.60 | 0.60 | 47.9 | 10.3 | 39.1 | 1.4 | 1.4 | 0.04 | <0.01 |
| Example 13 | 14.1 | 3.8 | 9.6 | 0.66 | 0.66 | 49.0 | 13.2 | 33.3 | 2.3 | 2.3 | 0.03 | <0.01 |
| Example 14 | 14.3 | 2.3 | 9.9 | 0.66 | 0.64 | 48.4 | 9.1 | 37.6 | 2.3 | 2.6 | 0.06 | <0.01 |
| Example 15 | 19.8 | 1.8 | 7.6 | 0.00 | 0.55 | 49.2 | 9.2 | 38.6 | 0.0 | 2.9 | 0.04 | <0.01 |
| Comparative Example 1 | 25.2 | 2.3 | 9.6 | 0.62 | 0.00 | 46.4 | 9.8 | 41.0 | 2.8 | 0.0 | 0.04 | <0.01 |
| Comparative Example 2 | 25.1 | 2.3 | 9.5 | 1.23 | 0.00 | 44.9 | 9.6 | 40.5 | 5.0 | 0.0 | 0.04 | <0.01 |
| Comparative Example 3 | 23.4 | 2.1 | 9.0 | 0.61 | 5.78 | 39.4 | 7.4 | 31.2 | 2.1 | 19.9 | 0.04 | <0.01 |
| Comparative Example 4 | 21.3 | 2.3 | 9.3 | 0.72 | 0.00 | 46.7 | 8.9 | 41.5 | 2.8 | 0.0 | 0.15 | 0.01 |

TABLE 3

| | Ratio of Crystal Phase | | | | | | | Presence or Absence of Oxide Films | Thickness of Oxide Films μm | Open Porosity % | Honeycomb Bending Strength MPa | Bending Strength MPa | Change in NOx Purification Ratio | Angle of Rise Degree |
|---|---|---|---|---|---|---|---|---|---|---|---|---|---|---|
| | Aggregate | | | Binding Material | | | | | | | | | | |
| | SiC | SiO$_2$ (Cristobalite) | Cordierite | Mullite | SrAl$_2$Si$_2$O$_8$ (Monoclinic Crystal) | SrAl$_2$Si$_2$O$_8$ (Hexaclinic Crystal) | CeO$_2$ | | | | | | | |
| | mass % | | | | mass% | | | | | | | | | |
| Example 1 | 65.5 | 12.0 | 17.8 | 4.7 | 0.0 | 0.0 | 0.0 | Present | 1.0 | 61.5 | 4.1 | 13.6 | ○ | 22.8 |
| Example 2 | 66.0 | 12.4 | 17.3 | 4.3 | 0.0 | 0.0 | 0.0 | Present | 1.1 | 62.9 | 4.5 | 14.6 | ○ | 18.6 |
| Example 3 | 63.4 | 12.7 | 17.6 | 4.9 | 1.2 | 0.0 | 0.2 | Present | 0.8 | 62.0 | 4.3 | 14.1 | ○ | — |
| Example 4 | 65.3 | 11.8 | 15.7 | 2.5 | 4.2 | 0.0 | 0.5 | Present | 1.0 | 59.5 | 3.6 | 12.0 | ○ | 20.9 |
| Example 5 | 66.2 | 12.2 | 17.8 | 3.8 | 0.0 | 0.0 | 0.0 | Present | 0.9 | 61.5 | 5.1 | 16.8 | ○ | 13.4 |
| Example 6 | 68.6 | 9.6 | 16.7 | 4.6 | 0.4 | 0.0 | 0.1 | Present | 0.5 | 62.0 | 4.5 | 14.0 | ○ | — |
| Example 7 | 61.5 | 17.3 | 16.5 | 4.6 | 0.0 | 0.0 | 0.1 | Present | 1.6 | 60.0 | 4.3 | 13.1 | ○ | — |
| Example 8 | 66.5 | 12.0 | 15.9 | 4.3 | 1.2 | 0.0 | 0.1 | Present | 1.0 | 61.1 | 5.1 | 16.5 | ○ | — |
| Example 9 | 66.5 | 12.2 | 15.7 | 4.1 | 1.3 | 0.0 | 0.2 | Present | 1.1 | 61.9 | 3.6 | 12.1 | ○ | — |
| Example 10 | 66.0 | 12.2 | 17.8 | 4.0 | 0.0 | 0.0 | 0.0 | Present | 0.9 | 63.8 | 3.5 | 12.0 | ○ | — |
| Example 11 | 79.2 | 13.0 | 5.4 | 1.2 | 1.0 | 0.0 | 0.1 | Present | 1.1 | 65.0 | 2.7 | 9.5 | ○ | 13.1 |
| Example 12 | 44.1 | 18.0 | 30.6 | 6.1 | 1.1 | 0.0 | 0.1 | Present | 1.0 | 55.0 | 6.5 | 20.0 | ○ | — |
| Example 13 | 70.1 | 11.3 | 17.2 | 0.0 | 1.2 | 0.0 | 0.2 | Present | 1.1 | 62.0 | 3.1 | 10.0 | ○ | — |

TABLE 3-continued

| | Ratio of Crystal Phase | | | | | | Presence or Absence of Oxide Films | Thickness of Oxide Films μm | Open Porosity % | Honeycomb Bending Strength MPa | Bending Strength MPa | Change in NOx Purification Ratio | Angle of Rise Degree |
| | Aggregate | | Binding Material | | | | | | | | | | |
| | SiC mass % | $SiO_2$ (Cristobalite) | Cordierite | Mullite | $SrAl_2Si_2O_8$ (Monoclinic Crystal) mass% | $SrAl_2Si_2O_8$ (Hexaclinic Crystal) | $CeO_2$ | | | | | | | |
|---|---|---|---|---|---|---|---|---|---|---|---|---|---|
| Example 14 | 76.3 | 0.0 | 17.1 | 5.4 | 0.0 | 1.2 | 0.0 | Absent | — | 64.4 | 3.0 | 10.2 | ○ | — |
| Example 15 | 78.4 | 0.0 | 17.8 | 3.8 | 0.0 | 0.0 | 0.0 | Absent | — | 63.6 | 3.4 | 11.0 | ○ | 24.2 |
| Comparative Example 1 | 65.5 | 12.0 | 17.8 | 4.7 | 0.0 | 0.0 | 0.0 | Present | 1.2 | 62.0 | 2.6 | 8.5 | ○ | 27.2 |
| Comparative Example 2 | 64.5 | 12.6 | 17.8 | 4.7 | 0.0 | 0.0 | 0.4 | Present | 1.4 | 63.4 | 2.3 | 7.6 | ○ | 28.1 |
| Comparative Example 3 | 53.3 | 10.2 | 14.9 | 3.1 | 18.1 | 0.0 | 0.4 | Present | 1.1 | 48.0 | 6.0 | 20.0 | ○ | — |
| Comparative Example 4 | 67.5 | 13.8 | 15.7 | 2.5 | 0.0 | 0.0 | 0.5 | Present | 1.1 | 65.0 | 3.0 | 10.0 | × | 28.9 |

The ratio of the mass of each crystalline phase (SiC, cristobalite, cordierite, mullite, $SrAl_2Si_2O_8$ (monoclinic crystal), $SrAl_2Si_2O_8$ (hexaclinic crystal), and $CeO_2$) in the porous material was obtained as follows. An X-ray diffraction pattern of the porous material was obtained using an X-ray diffractometer. As the X-ray diffractometer, a multi-functional powder X-ray diffractometer (D8 ADVANCE manufactured by Bruker corporation) was used. The conditions of the X-ray diffraction measurement were as follows: a CuKα-ray source, 10 kV, 20 mA, and 2θ=5 to 100°. Then, each crystalline phase was determined quantitatively by analyzing the obtained X-ray diffraction data by the Rietveld method using analysis software TOPAS (manufactured by Bruker AXS). The ratio of the mass of each constituent crystalline phase was calculated, assuming that the sum of the masses of all crystalline phases that could be detected was 100 mass %. In all of the porous materials of Examples 1 to 15 and Comparative Examples 1 to 4, the binding material contained 50 mass % or more (to be more specific, 65 mass % or more) of cordierite with respect to the mass of the whole binding material.

Assuming that the mass of the whole porous material was 100 mass %, the ratio of the mass of minor components ($Na_2O$ and $K_2O$) in the porous material was determined by inductively coupled plasma (ICP) emission spectroscopy. The ratio of the mass of the Na component in the alkali metal components was a value expressed in terms of $Na_2O$, and the ratio of the mass of the K component in the alkali metal components was a value expressed in terms of $K_2O$. In the porous materials of all of Examples 1 to 15 and the porous materials of Comparative Examples 1 to 3, the total ratio of the masses of $Na_2O$ and $K_2O$, i.e., the ratio of the mass of the alkali metal components in terms of an oxide, was less than 0.1 mass %. In the porous material of Comparative Example 4, the ratio of the mass of the alkali metal components in terms of an oxide was greater than or equal to 0.1 mass %.

The ratio of the mass of each oxide component ($SiO_2$, MgO, $Al_2O_3$, $CeO_2$, and SrO) in the porous material was also determined by ICP emission spectroscopy, assuming that the mass of the whole porous material was 100 mass % (see "Composition Ratio of Oxide" in Table 2). Here, only C was determined quantitatively by a method compliant with JIS Z 2615 (quantitative determination of carbon in metallic materials) and JIS Z 2616 (quantitative determination of sulfur in metallic materials), i.e., by combustion-infrared absorption method in an oxygen flow. The ratio of the mass of SiC was calculated assuming that the all C was derived from SiC as the particle bodies of the aggregate, and the ratio of the mass of $SiO_2$ contained in the whole porous material was obtained assuming that the remaining Si component, which was obtained by removing SiC from Si determined by ICP emission spectroscopy, was derived from $SiO_2$. The ratio of the mass of each component ($SiO_2$, MgO, $Al_2O_3$, $CeO_2$, and SrO) contained in the binding material (the ratio of the mass to the mass of the whole binding material) was a value obtained by subtracting the ratio of the mass of cristobalite determined by X-ray diffraction analysis from the above ratio of the mass of $SiO_2$ determined by using ICP emission spectroscopy and assuming that the total of the ratio of the mass of the remaining $SiO_2$ and the ratios of the masses of MgO, $Al_2O_3$, $CeO_2$, and SrO determined by the same ICP emission spectroscopy was 100 mass % (see "Composition Ratio of Binding Material" in Table 2).

As a method for observing the oxide films ($SiO_2$ films) in the aggregate, a specimen obtained by mirror-polishing a porous material contained in a resin with diamond slurry or other materials was used as an observation specimen, and a cross-sectional polished surface of this specimen was examined at a magnification of 1500 times to observe oxides films around SiC. In Table 3, examples for which the presence of the oxide films was confirmed under the aforementioned observation conditions are shown as "Present," and examples for which the presence of the oxide films was not confirmed are shown as "Absent." In the porous materials of Examples 1 to 13 and Comparative Examples 1 to 4 that had undergone the oxidation treatment, the presence of the oxide films was confirmed and cristobalite was detected, whereas in the porous materials of Examples 14 and 15 that had not undergone the oxidation treatment, neither the presence of the oxide films was confirmed nor cristobalite was detected. Thus, it can be said that the oxide films are cristobalite.

As a method for measuring the thickness of the oxide films (SiO$_2$ films) in the aggregate, a specimen obtained by mirror-polishing a porous material contained in a resin with diamond slurry or other materials was used as an observation specimen, and a cross-sectional polished surface of this specimen was examined at a magnification of 750 times to observe oxide films around SiC. Then, a thickness ranging from an interface between an oxide film and a pore to an interface between the oxide film and a SiC particle was measured as the thickness of the oxide film. In the field of magnification of 750 times, any 15 points were arbitrarily chosen, and an average value of the thicknesses of the oxide films measured at these points was taken as the thickness of the oxide films in the porous material. It can be seen from Examples 6 and 7 that a high temperature of the oxidation treatment increased the thickness of the oxide films and the ratio of the mass of cristobalite.

The open porosity was measured by the Archimedes method using pure water as a medium and using a plate piece obtained by cutting the porous material to dimensions of 20 mm×20 mm×0.3 mm. In the measurement of the honeycomb bending strength, a specimen (3 cells×5 cells× 30 to 40 mm) of the honeycomb structure (porous material) that was long in the direction of penetration of the cells was used and subjected to a four-point bending test that was compliant with JIS R1601 and conducted in the direction perpendicular to the longitudinal direction of the cells. In the measurement of the bending strength, the honeycomb structure was processed into a specimen with a height of 0.3 mm, width of 4 mm, and length of 40 mm, and this specimen was subjected to a bending test compliant with JIS R1601 as in the measurement of the honeycomb bending strength.

Changes in NOx purification rate before and after the heat treatment were obtained as follows. First, the obtained porous material was pulverized in a mortar until it would pass through a No. 100-mesh sieve (with an aperture size of 150 μm). The pulverized base material and a zeolite catalyst for purifying NOx were mixed at a weight ratio of 3:1, and the mixed powder was subjected to uniaxial press-molding using a mold with a diameter of 30 mm. A pellet obtained by the molding process was then pulverized into particles of 2 to 3 millimeters and used as an evaluation sample. The sample was held at 900° C. for two hours in an oxidizing atmosphere containing 10% of water vapor, and the evaluation sample that had undergone the heat treatment was obtained.

Such samples were evaluated using a vehicle emission analyzer (SIGU-1000 manufactured by HORIBA, Ltd.). As the conditions of the evaluation, the temperature was set in the range of 200 to 500° C.; a mixture gas that contained 10% of O$_2$, 8% of CO$_2$, 5% of H$_2$O, 150 ppm of NO, and 300 ppm of NH$_3$ was introduced as a reaction gas; and the concentration of each component in the exhaust gas passing through a measurement sample was analyzed using an exhaust-gas measuring device (MEXA-6000FT manufactured by HORIBA, Ltd.) so as to evaluate a reduction ratio of the NO gas. The same test was conducted on both of the sample that had undergone the heat treatment and the sample that had not undergone the heat treatment, and a porous material whose NOx conversion ratio at each measurement temperature did not show changes of a predetermined value or more between the both was marked with an open circle, and a porous material whose NOx conversion ratio at any measurement temperature showed changes of the predetermined value or more between the both was marked with a letter X. Only the porous material of Comparative Example 4, in which the ratio of the mass of the alkali metal component was greater than or equal to 0.1 mass %, showed a change of the predetermined value or more in NOx conversion ratio.

Figure 9:
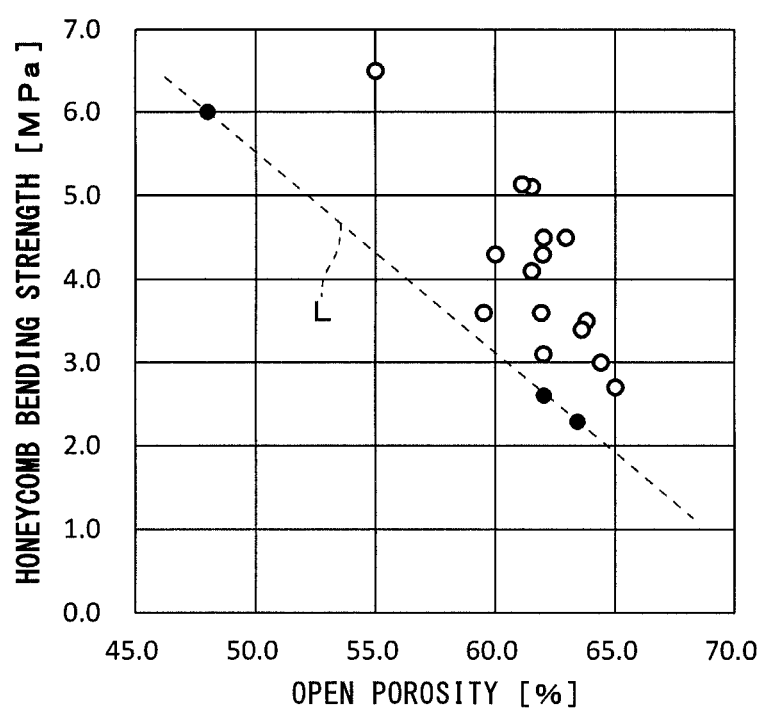
FIG. 9 illustrates a relationship between the open porosity of the porous material and honeycomb bending strength.

FIG. 9 illustrates a relationship between the open porosity and the honeycomb bending strength for the porous materials (honeycomb structures) produced as Examples 1 to 15 and Comparative Examples 1 to 3. In FIG. 9, the measurement results for the porous materials of Examples 1 to 15 are plotted with open circles, and the measurement results for the porous materials of Comparative Examples 1 to 3 are plotted with filled circles. FIG. 9 omits illustration of the measurement results for the porous material of Comparative Example 4 that showed changes of the predetermined value or more in NOx conversion ratio. FIG. 9 also illustrates a straight line L that indicates correlation between the open porosity and the honeycomb bending strength, obtained from the porous materials of Comparative Examples 1 to 3.

As illustrated in FIG. 9, the plots of the porous materials of Examples 1 to 15 are above the straight line L, and it can be said that the porous materials of Examples 1 to 15 had higher mechanical strength than the porous materials of Comparative Examples 1 to 3. This straight line L shows that the honeycomb bending strength was 1.9 MPa when the open porosity was 65.0%. In contrast, the porous material of Example 11 including 12.0 mass % of the Sr component in terms of SrO in the binding material and having the same porosity of 65.0% had a honeycomb bending strength of 2.7 MPa, i.e., had a sufficiently high bending strength. Thus, it is conceivable that the mechanical strength of the porous material can be increased if the ratio of the mass of the Sr component in the binding material in terms of SrO is less than or equal to 15.0 mass %. The measurement results for the porous material of Example 1, which contained 1.3 mass % of the Sr component in the binding material, show that this porous material had a sufficiently higher bending strength than the porous material of Comparative Example 1 with an equivalent open porosity. Thus, it is conceivable that the mechanical strength of the porous material can be increased if the ratio of the mass of the Sr component in the binding material in terms of SrO is greater than or equal to 0.3 mass %. As can be seen from Table 2, in the porous materials of Comparative Examples 1 to 3, the ratio of the mass of the Sr component in terms of SrO to the mass of the whole porous material was out of the range of 0.01 to 5.5 mass %, whereas in the porous materials of Examples 1 to 15, the ratio of the mass of the Sr component was within this range. Besides, even the porous materials of Examples 5, 10, and 15, which did not contain CeO$_2$ in the raw material of binding material, had a high bending strength. This indicates that whether to include CeO$_2$ in the raw material of binding material may be arbitrarily determined.

In Table 3, a representative value for the angle of rise on the edge of the binding material is also shown in the "Angle of Rise" column for the porous materials of Examples 1, 2, 4, 5, 11, and 15 and Comparative Examples 1, 2, and 4. The angle of rise on the edge of the binding material was obtained by the technique described with reference to FIGS. 7A and 7B. Here, 10 measurement positions were specified in an image obtained by photographing a cross-sectional polished surface at a magnification of 1500 times, and an average value of the 10 angles of rise was obtained. In the porous materials of Examples 1, 2, 4, 5, 11, and 15 that contained the Sr component in the binding material, the representative value for the angle of rise was less than or equal to 25 degrees. These porous materials contained 0.3 to 1.2 mass % of the Sr component in terms of SrO with respect to the mass of the whole porous material (see Table 2).

Moreover, the binding material contained 1.3 to 12.0 mass % of the Sr component in terms of SrO with respect to the mass of the whole binding material. In contrast, in the porous materials of Comparative Examples 1, 2, and 4 that did not contain the Sr component in the binding material, the representative value for the angle of rise was greater than 25 degrees. The porous materials of Examples 5 and 15 did not contain $CeO_2$ in the binding material.

The porous material 1, the honeycomb structure, and the method of producing a porous material described above may be modified in various ways.

The porous material 1 may be formed in a form other than the honeycomb structure, and may be used in various applications other than filters. Depending on the application of the porous material 1, the aggregate 2 may contain particles of a plurality of types of substances.

The method of producing the porous material 1 and the honeycomb structure is not intended to be limited to the examples described above, and may be modified in various ways.

The configurations of the preferred embodiments and variations described above may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention. This application claims priority benefit under 35 U.S.C. Section 119 of Japanese Patent Application No. 2016-208153 filed in the Japan Patent Office on Oct. 24, 2016, Japanese Patent Application No. 2017-113987 filed in the Japan Patent Office on Jun. 9, 2017, and Japanese Patent Application No. 2017-172071 filed in the Japan Patent Office on Sep. 7, 2017, the entire disclosures of which are incorporated herein by reference.

INDUSTRIAL APPLICABILITY

The porous material according to the present invention may be used as materials for, for example, catalyst carriers and DPFs. The honeycomb structure according to the present invention may be used as, for example, a catalyst carrier or a DPF. The method of producing a porous material according to the present invention may be used to produce the above-described porous material.

REFERENCE SIGNS LIST

1 Porous material
2, 2a, 2b Aggregate
3 Binding material
4 Pore
5 Sr component
S11 to S13 Step

The invention claimed is:
1. A porous material comprising:
an aggregate containing SiC particles as particle bodies; and
a binding material that binds said aggregate together in a state where pores are formed,
wherein said porous material contains 0.1 to 10.0 mass % of an MgO component, 0.5 to 25.0 mass % of an $Al_2O_3$ component, and 22.6 to 45.0 mass % of an $SiO_2$ component with respect to a mass of said porous material as a whole,
said porous material further contains Sr which is determined as 0.01 to 5.5 mass % of SrO when measured by inductively coupled plasma emission spectroscopy and expressed in terms of SrO,
said porous material further contains Na or K as an alkali metal component,
Na is determined as 0.08 mass % or less of $Na_2O$ when measured by inductively coupled plasma emission spectroscopy and expressed in terms of $Na_2O$, and
K is determined as less than 0.01 mass % of $K_2O$ when measured by inductively coupled plasma emission spectroscopy and expressed in terms of $K_2O$, and
wherein an average value for an angle at which an edge of said binding material in a cross-section of said porous material rises with respect to a direction tangent to the edge at a measurement position at which curvature is locally a maximum is greater than 0 degrees and less than or equal to 25 degrees, said cross-section of said porous material being photographed at a magnification of 1500 times with a scanning electron microscope, said edge of said binding material being a boundary line between said binding material and a pore, an interface between a particle of said aggregate, said binding material and a pore being defined as a three-phase interface, said measurement position being a position which has a maximum curvature on said edge of said binding material between one three-phase interface with one particle of said aggregate and another three-phase interface with another particle of said aggregate, said average value being obtained from 10 measured values at 10 measurement positions.

2. The porous material according to claim 1, wherein said binding material contains 50 mass % or more of cordierite with respect to a mass of said binding material as a whole.

3. The porous material according to claim 1, wherein a ratio of a mass of said binding material to a mass of said porous material as a whole is in a range of 8 to 40 mass %.

4. The porous material according to claim 1, wherein a ratio of a mass of said alkali metal component in terms of an oxide is less than 0.1 mass % of said porous material as a whole.

5. The porous material according to claim 1, wherein said aggregate further contains oxide films that are formed on surfaces of said particle bodies.

6. The porous material according to claim 5, wherein said oxide films contain cristobalite.

7. The porous material according to claim 5, wherein said oxide films have a thickness of 0.3 to 5.0 μm.

8. The porous material according to claim 1, wherein at least part of Sr contained in said binding material exists as $SrAl_2Si_2O_8$.

9. The porous material according to claim 8, wherein a ratio of a mass of said $SrAl_2Si_2O_8$ to a mass of said porous material as a whole is in a range of 0.1 to 10.0 mass %.

10. A honeycomb structure that is a tubular member made of the porous material according to claim 1 and having an interior partitioned into a plurality of cells by partition walls.

11. A method of producing a porous material, comprising:
a) obtaining a compact by molding a mixture of an aggregate raw material containing SiC particles as particle bodies, a raw material of binding material, and a pore forming material; and
b) obtaining a porous material by firing said compact, said porous material being a fired compact, wherein said porous material contains 0.1 to 10.0 mass % of an MgO component, 0.5 to 25.0 mass % of an $Al_2O_3$ component, and 22.6 to 45.0 mass % of an $SiO_2$ component with respect to a mass of said porous material as a whole, said porous material further contains Sr which is determined as 0.01 to 5.5 mass % of SrO when measured by inductively coupled plasma emission spectroscopy and expressed in terms of SrO, said porous material further contains Na or K as an alkali metal component, Na is determined as 0.08 mass % or less of $Na_2O$ when measured by inductively coupled plasma emission spectroscopy and expressed in terms of $Na_2O$, and K is determined as less than 0.01 mass % of $K_2O$ when measured by inductively coupled plasma emission spectroscopy and expressed in terms of $K_2O$, and wherein an average value for an angle at which an edge of said binding material in a cross-section of said porous material rises with respect to a direction tangent to the edge at a measurement position at which curvature is locally a maximum is greater than 0 degrees and less than or equal to 25 degrees, said cross-section of said porous material being photographed at a magnification of 1500 times with a scanning electron microscope, said edge of said binding material being a boundary line between said binding material and a pore, an interface between a particle of said aggregate, said binding material and a pore being defined as a three-phase interface, said measurement position being a position which has a maximum curvature on said edge of said binding material between one three-phase interface with one particle of said aggregate and another three-phase interface with another particle of said aggregate, said average value being obtained from 10 measured values at 10 measurement positions.

* * * * *